United States Patent [19]
Aubert

[11] Patent Number: 5,474,492
[45] Date of Patent: Dec. 12, 1995

[54] METHOD AND DEVICE FOR CUTTING OUT AND PLUGGING THE ANAL ORIFICE OF SLAUGHTERED ANIMALS

[76] Inventor: Georges Aubert, Mas d'Armor quartier de la Roumiguiere, Roquevaire 13360, France

[21] Appl. No.: 290,871
[22] PCT Filed: Jan. 7, 1994
[86] PCT No.: PCT/FR94/00021
    § 371 Date: Aug. 29, 1994
    § 102(e) Date: Aug. 29, 1994
[87] PCT Pub. No.: WO94/15471
    PCT Pub. Date: Jul. 21, 1994

[30] Foreign Application Priority Data

Jan. 8, 1993 [FR] France ................. 93 00320
Nov. 8, 1993 [FR] France ................. 93 13594

[51] Int. Cl.⁶ ........................................ A23B 5/00
[52] U.S. Cl. ........................................... 452/176
[58] Field of Search ............................... 452/176

[56] References Cited

U.S. PATENT DOCUMENTS

| | | | |
|---|---|---|---|
| 3,786,535 | 1/1974 | Labarber | 452/176 |
| 3,921,255 | 11/1975 | Labarber | 452/176 |
| 3,975,796 | 8/1976 | Labarber | 452/176 |
| 5,083,975 | 1/1992 | Neal et al. | 452/176 |
| 5,114,380 | 5/1992 | Larsen | 452/176 |
| 5,120,266 | 6/1992 | Aubert | 452/176 |
| 5,120,267 | 6/1992 | Neal et al. | 452/176 |
| 5,181,878 | 1/1993 | Bekkers | 452/176 |
| 5,292,278 | 3/1994 | Neal et al. | 452/176 |

FOREIGN PATENT DOCUMENTS

| | | |
|---|---|---|
| 0425106 | 5/1991 | European Pat. Off. . |
| 0457408 | 11/1991 | European Pat. Off. . |
| 0488571 | 6/1992 | European Pat. Off. . |
| 2640465 | 6/1990 | France . |
| 90-06685 | 6/1990 | WIPO . |

OTHER PUBLICATIONS

International Search Report and Annex.

*Primary Examiner*—Willis Little
*Attorney, Agent, or Firm*—Sandler, Greenblum & Bernstein

[57] ABSTRACT

Method and apparatus for cutting out and plugging the anal orifice of slaughtered animals in any slaughtering facility. The method comprises cutting out the rectum of the animal with a cylindrical cutter arranged around a centering mandrel and provided with side openings for immediately removing any waste matter that becomes stuck within the cutter, and injecting ground fat or a similar material into the anus with a pressurizing device controlled by automation equipment of the facility. The device is connected via a flexible duct to an inner channel in the centering mandrel for the tool for cutting out the rectum. The method and apparatus are suitable for use in any slaughtering facility, particularly high throughput abattoirs.

27 Claims, 2 Drawing Sheets

5,474,492

METHOD AND DEVICE FOR CUTTING OUT AND PLUGGING THE ANAL ORIFICE OF SLAUGHTERED ANIMALS

BACKGROUND OF THE INVENTION

1. Field of the Invention

The object of the present invention is a method and a device for cutting out and plugging the anal orifice of slaughtered animals.

The method and device are suitable for use in any slaughtering facility, particularly in high-throughput abattoirs.

2. Discussion of Background Information

To date, anal cutting devices, such as those described in U.S. Pat. No. 3,921,255, are constituted of a cylindrical cutter closed at the rear end, which does not allow proper functioning in the automatic mode because of tails which gather in the inside and pile up at the bottom since there is no outlet.

In addition, the European Community Veterinary Hygiene Department requires that the anal orifice of slaughtered animals be obstructed in order to prevent the materials contained in the intestine from spilling on or into the carcass. The cutting tools mentioned hereinabove do not lend themselves well for carrying out such an operation, which is usually confined to the manual positioning of an obstructor which, especially in automated facilities, requires an increase in the quantity of necessary personnel, and consequently increases production costs.

WO 90/06685 by the same inventor describes an automatic system for distributing and positioning hollow and conically-shaped anal obstructors made of plastic, positioned by the centering mandrel of the tool for cutting out the rectum. This system has proven to be incapable of reaching the working speeds of modern high performance facilities.

Known anal obstructors, regardless of the positioning method used, are not absolutely impermeable and it happens that their fixing does not withstand the subsequent handling that the carcasses are subject to.

SUMMARY OF THE INVENTION

The method according to the present invention overcomes all these disadvantages. Indeed, it not only enables immediate removal of tail pieces being introduced into the cutter, thus eliminating the previously necessary stopping of the operation of the facility to periodically empty the cutter, but also enables automatically proceeding to plug the anal orifice at very high through-puts, while ensuring total impermeability and eliminating the risk of accidental opening.

The method according to the invention includes first cutting out the rectum of the animal by means of a cylindrical cutter mounted around the centering mandrel and provided with side openings enabling immediate removal of any waste matter that becomes stuck within the cutter, and injecting ground fat or similar material into the anus with a pressuring device controlled by automation equipment of the facility, the device being connected via a flexible duct to an inner channel of the centering mandrel for the tool for cutting out the rectum.

BRIEF DESCRIPTION OF THE DRAWINGS

In the annexed drawings, provided as a non-limiting example of one of the embodiments of the object of the invention.

DETAILED DESCRIPTION OF THE PREFERRED EMBODIMENTS

Figure 1:
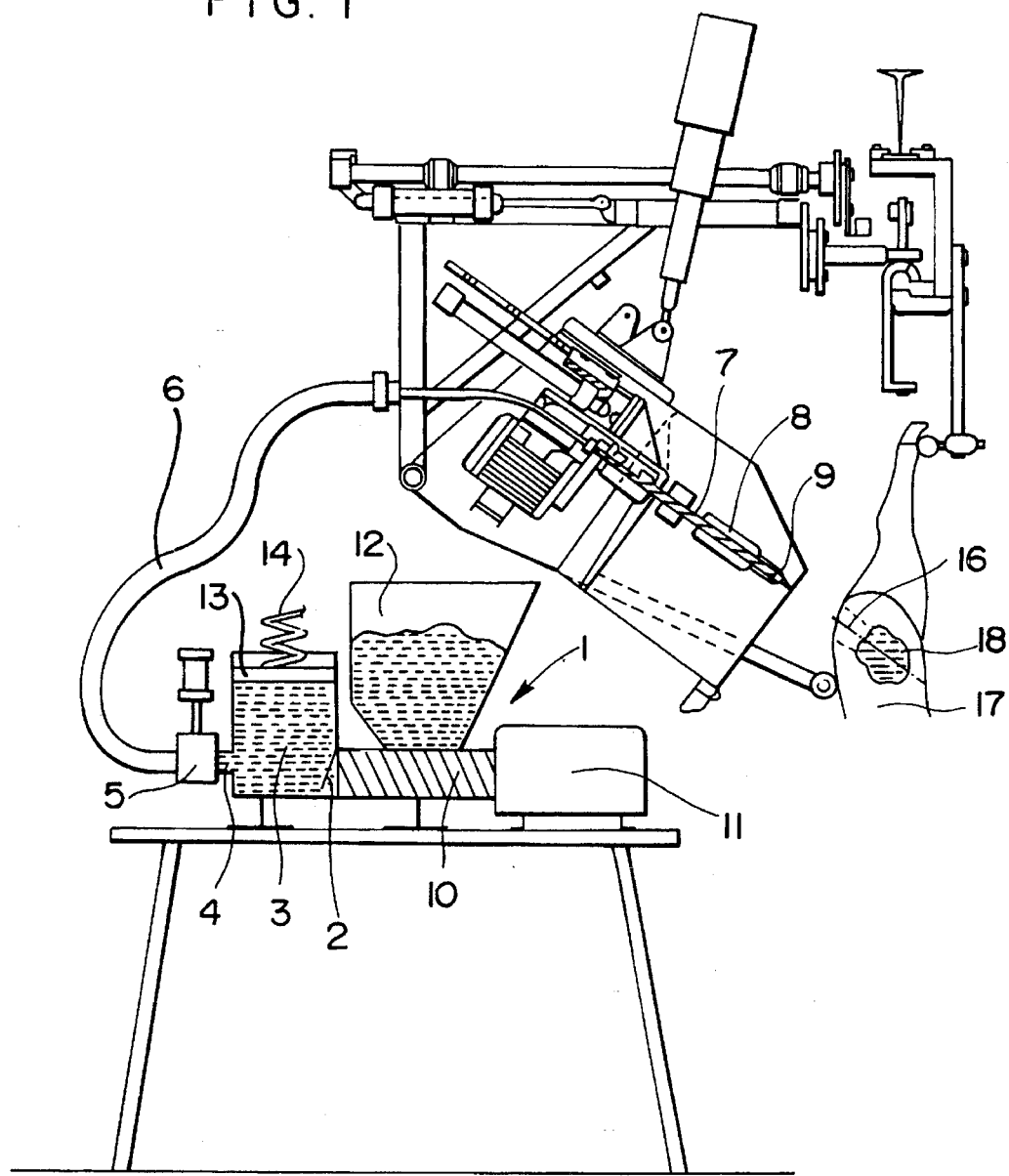
FIG. 1 represents a slaughtering line station equipped with a rectum cutting tool having a cylindrical cutter with side openings and a fat injection device.

The device, FIG. 1, is composed of a grinder 1, discharging by means of an non-return valve 2 into a pressurizing chamber 3 whose outlet 4 is controlled by a motorized valve 5.

A flexible duct 6 connects the valve to an axial inner channel 7 provided for this purpose in centering mandrel 9 of the tool for cutting out 8 the rectum, and abutting on the end of the tip of this mandrel.

Grinder 1 is advantageously constituted of a screw 10 rotating in a sheath, driven by an electric motor 11 and fed by a hopper 12, the sheath ending at non-return valve 2 mentioned above.

Pressurizing chamber 3 can be shaped like a cylinder, closed by a moveable piston 13, on which a carefully predetermined force is exerted by a spring 14 or other appropriate means.

Motorized valve 5 opens automatically, for example, by means of a pneumatic or hydraulic jack 15, or an electromagnet, when the tip of centering mandrel 9 has penetrated into rectum 16 of animal 17 during processing.

The ground fat, permanently maintained under a sufficient pressure in chamber 3, is then injected into the rectum so as to form a plug 18 of fat which infiltrates into all the openings and ensures an absolutely impermeable closure.

Advantageously, the fat used is that drawn from the processed animal themselves. This product is generally considered as waste and is discarded or sent to various industries for free. Furthermore, it can be recuperated when slaughtering operations are completed and follow the usual circuit; the fact that it is ground can only facilitate its handling.

Figure 2:
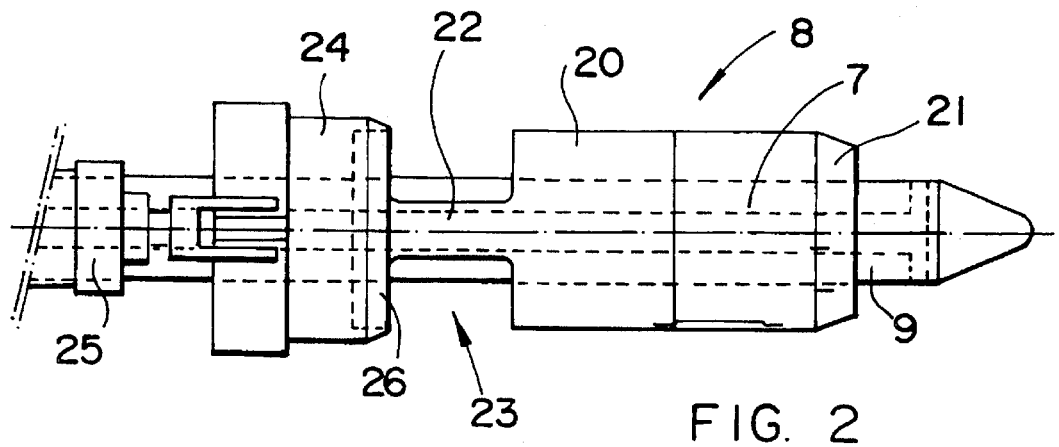
FIG. 2 is an enlarged side view of the cutter mounted on the centering mandrel with the waste removal outlets open, FIG. 3 show the cutter from a top view with the openings closed.
Figure 3:
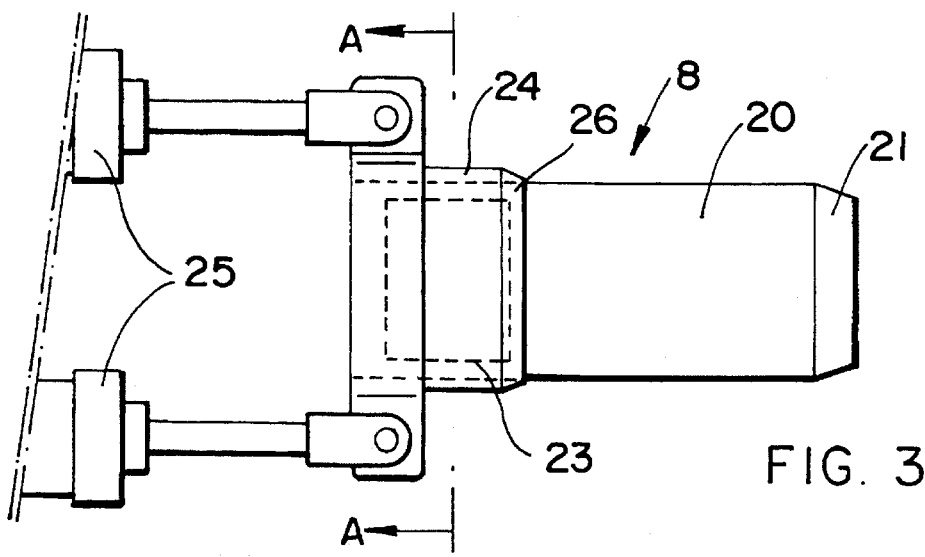
Figure 4:
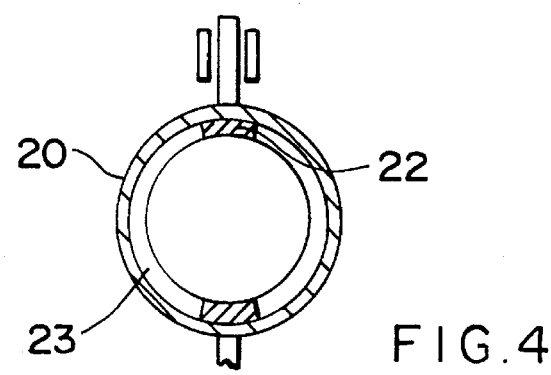
FIG. 4 is a transverse section along arrows A—A of FIG. 3

Cutting tool 8, as illustrated in FIGS. 2 to 4, is constituted of a cylindrical cutter 20 having a circular blade 21 mounted around centering mandrel 9.

The rear portion of the cylindrical wall is interrupted and fixed on the body of the cutter by longitudinal spacers 22, so as to form side openings 23 enabling immediate removal of any waste matter that becomes stuck within the cutter during its operation, and especially tail pieces.

Openings 23 can be advantageously obtained by cutting the cylindrical wall of cutter 20.

An outer cylindrical sleeve 24 can slide axially along the wall of the cutter so as to obstruct, or inversely, clear openings 23. The displacement of this sleeve is caused by two jacks 25 or any other appropriate equivalent device, controlled or not by the automation elements of the facility. Closure is controlled during the penetration of cutting tool 8 into rectum 16 of animal 17, the opening taking place as soon as the cutter has exited.

Sleeve 24 is advantageously made of a plastic material having self-lubricating properties and comprises a thin front edge 26 to facilitate penetration of the movable assembly formed by centering mandrel 9, cutter 20 and the sleeve 24 into the body of the animal.

By virtue of its operational reliability, operating speed and low cost price, the device described hereinabove lends itself particularly well for outfitting slaughtering facilities of any types and especially high performance facilities.

The positioning of various constituent elements provides the object of the invention with a maximum of useful effects which to date, have not been obtained by similar systems.

I claim:

1. Method for plugging the anal orifice of slaughtered animals, comprising:

inserting a tool for cutting out the rectum of the animal including a centering mandrel comprising an axial inner channel into the rectum of an animal;

injecting a substance for plugging the rectum of the animal from a pressurizing device through a flexible duct to the axial inner channel; and controlling flow of substance from the pressurizing device to the axial inner channel with a motorized valve, the motorized valve being set in an open position when the centering mandrel has penetrated into the rectum of the animal to permit formation of a plug of substance to infiltrate into all openings and ensure an impermeable closure.

2. The method according to claim 1, wherein the substance comprises fat.

3. The method according to claim 2, wherein the substance comprises ground fat.

4. The method according to claim 2, wherein the fat is obtained from the slaughtered animals.

5. The method according to claim 1, wherein the slaughtered animals are processed in a slaughtering facility.

6. The method according to claim 5, wherein said slaughtering facility comprises a high throughput abattoir.

7. The method according to claim 5, wherein the motorized valve is controlled by automation equipment of said slaughtering facility.

8. The method according to claim 2, wherein the cutting tool comprises a cylindrical cutter including a circular blade comprising a wall including side openings enabling permanent removal of undesirable waste materials, and a second element for obstructing the openings during penetration of the cutting tool into the rectum.

9. Apparatus for plugging the anal orifice of slaughtered animals, comprising:

a pressurizing device;

a tool for cutting out the rectum of the animal including a centering mandrel comprising an axial inner channel;

a flexible duct for feeding a substance for plugging the rectum of the animal from said pressurizing device to said axial inner channel; and a motorized valve for controlling flow of the substance from said pressurizing device to said axial inner channel, so that said motorized valve is open when said centering mandrel has penetrated into the rectum of the animal so as to permit formation of a plug of substance to infiltrate into all openings and ensure an impermeable closure.

10. The apparatus according to claim 9, wherein said pressurizing device includes a pressurizing chamber, and a grinder discharges the substance through a non-return valve into said pressurizing chamber.

11. The apparatus according to claim 10, wherein said pressurizing chamber includes an outlet, and said motorized valve is associated with said outlet.

12. The apparatus according to claim 11, wherein said centering mandrel comprises a tip having an end, and said flexible duct is connected to said end.

13. The apparatus according to claim 12, wherein said grinder comprises a screw rotatably positioned in a sheath, and a hopper for feeding the substance to the screw.

14. The apparatus according to claim 13, comprising an electric motor for driving said screw.

15. The apparatus according to claim 13, wherein said non-return valve is positioned at an end of said sheath.

16. The apparatus according to claim 13, wherein said pressurizing chamber is cylindrically shaped and is closed by a movable piston, and further including a first element for exerting force on said piston.

17. The apparatus according to claim 10, wherein said pressurizing chamber is cylindrically shaped and is closed by a movable piston, and further including a first element for exerting force of said piston.

18. The apparatus according to claim 17, wherein said first element comprises a spring.

19. The apparatus according to claim 10, wherein said cutting tool comprises a cylindrical cutter including a circular blade comprising a wall including side openings enabling permanent removal of undesirable waste materials, and a second element for obstructing said openings during penetration of said cutting tool into the rectum.

20. The apparatus according to claim 19, wherein said second element comprises an outer cylindrical sleeve capable of axially sliding along said wall of said cylindrical cutter.

21. The apparatus according to claim 20, wherein said side openings are positioned at a rear portion of said cylindrical cutter.

22. The apparatus according to claim 21, wherein a rear portion of said wall is interrupted and connected to said cylindrical cutter by longitudinal spacers to form said side openings.

23. The apparatus according to claim 20, wherein said side openings are formed by cutting said wall.

24. The apparatus according to claim 20, wherein said outer cylindrical sleeve comprises a thin front edge.

25. The apparatus according to claim 20, wherein said outer cylindrical sleeve is composed of a plastic material possessing self-lubricating properties.

26. The apparatus according to claim 20, including third elements for displacing said outer cylindrical sleeve.

27. The apparatus according to claim 26, wherein said third elements comprise two jacks.

* * * * *